Patented Feb. 18, 1930

1,747,802

UNITED STATES PATENT OFFICE

JOHN T. TRAVERS, OF COLUMBUS, OHIO, ASSIGNOR, BY DIRECT AND MESNE ASSIGNMENTS, TO THE OHIO SANITARY ENGINEERING CORPORATION, OF COLUMBUS, OHIO, A CORPORATION OF OHIO

PROCESS FOR TREATING CREAMERY WASTE

No Drawing.  Application filed August 2, 1927. Serial No. 210,209.

This invention relates to a process for treating the waste liquids discharged from creameries in the handling of milk and milk products.

To fully appreciate the nature and composition of these waste liquids it is necessary that the various constituents of milk from which these wastes are formed be considered.

Milk, it will be understood, forms an emulsion consisting of very finely divided fat particles suspended in a solution consisting principally of protein bodies, milk sugar and salts. Casein is one of the most important constituents of milk and will be hereinafter given separate consideration.

The approximate composition of milk is as follows:—

| | Per cent |
|---|---|
| Water | 87.17 |
| Proteins | 3.55 |
| Fat | 3.69 |
| Milk sugar | 4.88 |
| Salts | .71 |

The proteins of the milk are subdivided into two parts or groups as follows:—

| | Per cent |
|---|---|
| Casein | 3.02 |
| Albumin | .53 |

In the normal or spontaneous souring of milk, lactic acid is formed and succinic acid may also be formed. When bacterial decomposition of milk takes place, lactic acid, dextrose, and levo acids, as well as succinic acid and volatile fatty acids such as acetic and butyric acids may be formed. Of the constituents of milk which are of primary importance in the treatment of creamery waste are casein, albumin and fat. Casein properly belongs to the class of true protein bodies and specifically to the group known as phosphorglobulins. Casein forms a high protective colloid and also enters into a colloidal combination with calcium phosphate. It has very marked acid properties, being in effect sufficiently acid to drive carbon dioxide from carbonates. The colloidal combination of casein and calcium phosphate, generally known as casein-calcium, is present in milk in the form of sub-microns. The casein acts as a protective colloid for the fat in the milk.

When milk sours in the ordinary way, the lactic acid thus formed acts upon the casein-calcium forming calcium lactate and calcium free casein, the casein being set free from its combination with calcium. When more lactic acid forms than is sufficient to combine with calcium, the free casein will take up the acid and produce a curd.

Various compounds or classes of compounds are produced by the action of enzymes and various micro-organisms on casein-calcium and para-casein. Such compounds are albumoses, peptones, amino acids and ammonia. Offensive odors accompany the formation of these compounds.

Casein is peptized by hydroxyl ions and the negative charge of the casein colloids is neutralized by the adsorption of cations. It is to be noted, therefore, that casein may be precipitated out of a solution having an alkaline reaction by the incorporation in such a solution of an electrolyte-producing material which will dissociate, freeing positive ions for adsorption by the negatively charged casein colloids.

The albumin constituent of the milk is also a true protein and accordingly subject to decomposition with the resultant formation of foul odors characteristic of decomposition of true proteins. The albumin content is present in the milk in the form of true colloids, which are positively charged when the solution has an acid reaction and negatively charged when the solution has an alkaline reaction. It may be generally stated that albumin can be readily peptized by cations and anions. In a slightly alkaline solution a strongly adsorbed ion will make the albumin colloids more negative and more stable. When in the latter state the albumin colloid may be readily precipitated by the addition of ions carrying a positive charge due to the adsorption of the ions of opposite sign by the negatively charged albumin colloids. For this reason it will be noted that albumin colloids may be precipitated from a slightly alkaline solution by the incorporation of an electrolyte producing material in the solution capable of dissociation and freeing positive ions.

The fat constituent of the milk is a variable mixture of several different compounds known as glycerides. Each glyceride is formed by the chemical action of glycerin as a base with some organic acid or acids. Milk fat will undergo decomposition under the action of certain bacteria forming among other products free butyric acid which gives off a very offensive odor. The fat particles found in milk are in a state of very fine suspension and can, to a certain extent, be precipitated or carried out of suspension by the employment of an efficient coagulant. From the foregoing discussion of casein, albumin and fat, the chemical and physical characteristics of these principal constituents of milk can be appreciated as well as the character of the products formed upon decomposition of milk and its several constituents.

Creamery waste is, therefore, in all instances composed of milk with all its constituents. If the process of souring is undergoing, the waste will contain lactic acid and may also contain succinic acid. If the bacterial decomposition of the waste is under way, the waste may also contain in addition to lactic and succinic acids, dextro and levo acids as well as volatile fatty acids. It will be appreciated that any successful process for treating creamery waste must of necessity remove these organic acids and the nitrogenous bodies present in the waste, the nitrogenous bodies and organic acids constituting the chief sources contributing to the pollution of streams or bodies of water receiving creamery waste. They not only require a great deal of oxygen for their oxidation but also furnish a source of food for the propagation of bacteria, resulting in the production of foul odors.

From the foregoing it will be noted that the putrescible constituents contained in creamery waste are largely present in colloidal form. My improved process is based upon the recognition of this fact and provides for the separation from the waste of the putrescible colloids and suspensoids present in the waste, as well as for the neutralization and destruction of the various acids present in the waste.

In carrying out the process a treating mixture comprising an electrolyte-producing material, an alkali and a coagulant, is introduced to the waste in any suitable manner and is uniformly distributed throughout the waste by use of suitable agitators. Subsequent to the introduction of the treating material to the waste, the waste is permitted to attain a quiescent state in a suitable settling zone to permit complete clarification of the liquid and the settling of all precipitated solids and flocs. The clarified effluent may thereafter be subjected to reaeration if found necessary.

A standard mixture for treating creamery waste may, for example, be uniformly composed of 100 parts. The proportions of the various constituents of the treating mixture may be varied within relatively wide limits. I find, however, that a mixture composed of 80 parts electrolyte-producing material, 15 parts alkali, and 5 parts of a suitable coagulant will usually give excellent results in the treating of creamery waste. The quantity of alkali, usually in the form of hydrated lime, employed will, to a large extent, depend upon the acidity of the waste. If the waste is neutral or alkaline in reaction, a very small quantity of alkali need be employed. The hundred parts forming the mixture may be kept constant by varying the other constituents. I find it advisable to at all times maintain the electrolyte-producing material present in the mixture in an amount equal to at least 50 parts thereof. The quantity of the coagulant employed will depend upon the efficiency of the particular coagulant and the rapidity of precipitation desired. The quantity of the treating mixture employed may be varied depending upon the specific characteristics of the particular creamery waste under treatment. Generally speaking, the practical limits may be stated to be from 3 to 18 pounds of treating material per each 1000 gallons of waste treated. The particular quantity best suited for the treatment of a given waste may be readily ascertained by making trial tests and noting the clarification of the liquid, the size of the floc, and the rapidity of precipitation.

In the treating mixture employed, various substances may be used as the electrolyte-producing material as, for example, calcium sulphate, magnesium sulphate, the waste dust collected from the precipitators employed in the manufacture of cement, and the solid waste recovered from waste solutions discharged from an alkali plant in the manufacture of chlorine, chloride of lime, and caustic soda. As above stated, the alkali in the mixture is usually present in the form of hydrated lime, while the coagulant may be ferrous sulphate, aluminum sulphate, or calcium monophosphate.

The several electrolyte-producing materials above referred to are characterized by their ability when incorporated in the waste solution to dissociate, forming positive and negative ions. The positive ions are adsorbed by the colloids, the signs of which are negative in the alkaline solution. The negative ions will react on the solution, releasing nascent oxygen which functions as a supplemental purifying agent in my process, acting to destroy bacteria and supply a substantial quantity of dissolved oxygen to the effluent. If the dissolved oxygen content of the effluent is not raised to the desired degree, the effluent may be reaerated in a very short period by passing the same through a runway loaded with travertine. A complete aeration of the effluent may be effected in a period of fifteen minutes.

As illustrating the operation and effects of the process, a quantity of creamery waste was treated in accordance with the process. The waste showed upon analysis:

|  | P. P. M. |
|---|---|
| Nitrogeneous bodies as N | 420 |
| Fat | 436 |
| Calcium phosphate | 39 |

The effluent produced by the treatment of this waste with substantially three pounds of treating mixture per thousand gallons of waste showed upon analysis:

|  | P. P. M. |
|---|---|
| Nitrogeneous bodies as N | 14 |
| Fat | 5 |
| Calcium phosphate | 6 |

From the foregoing it will be noted that a reduction of 97% in the nitrogeneous matter and a reduction of 98.8% in the fat contents is obtained by treatment in accordance with my process.

Since the casein forms a colloidal combination with calcium phosphate in milk, the precipitation of the casein will also effect a precipitation of the phosphate. The foregoing analysis shows a 100% reduction in phosphates, no phosphates being present in the effluent.

The reactions which are effected in the process may be summarized as follows:—

(1) The waste is changed from an acid to an alkaline condition, the sign of the colloids being changed from positive to negative.

(2) All acids in the waste are neutralized.

(3) There is a formation of a positively charged colloidal hydroxide.

(4) The positively charged colloidal hydroxide and the positive ions of the electrolyte unite with the negatively charged colloidal bodies.

(5) The positively charged ions being in slight excess, the charges on the colloids are neutralized to the isoelectric point and maximum coagulation takes place. The precipitating ions are carried down with the colloidal bodies, being adsorbed by them.

(6) The ferrous hydroxide formed by the action of the alkaline solution on the ferrous sulphate assists in breaking the equilibrium of the waste and furnishes the gelatinous flocs for the coagulation phase. It also serves to collect and hold the fat particles which are in suspension.

(7) Any coloring matter present in colloidal form is precepitated by the negative sulphate ion. Negative ions also react with the solution to free nascent oxygen.

(8) The excess of the electrolyte-producing material assists in increasing the rate of settling of the precipitated solids and greatly improves the physical character of the sludge.

The description herein contained is merely illustrative of the operation of the process and it is contemplated within the broad scope of the invention such changes and modifications as may be necessary to adapt the same to use in any given creamery.

I claim:—

1. A process for purifying creamery waste containing casein and alubumin, comprising incorporating in the waste from 3 to 16 pounds of a treating mixture per thousand gallons of the waste, said treating mixture containing hydrated lime, an electrolyte producing material, and a coagulant, the electrolyte producing material representing in excess of 50% of the total mixture, agitating the waste to which the mixture has been added to thoroughly distribute the treating mixture therethrough, thereafter permitting the waste to assume a quiescent state, removing the effluent from the preciptate and subjecting the same to aeration for a period of substantially fifteen minutes.

2. A process for purifying creamery waste containing casein and albumin, comprising incorporating in the waste from 3 to 16 pounds of a treating mixture per thousand gallons of the waste, said treating mixture containing hydrated lime, an electrolyte producing material, and a coagulant, the electrolyte producing material representing in excess of 50% of the total mixture, agitating the waste to which the mixture has been added to thoroughly distribute the treating mixture therethrough, thereafter permitting the waste to assume a quiescent state, removing the effluent from the precipitate and subjecting the same to aeration for a period of substantially fifteen minutes by passing the same through a runway loaded with travertine.

JOHN T. TRAVERS.